United States Patent Office 3,561,985
Patented Feb. 9, 1971

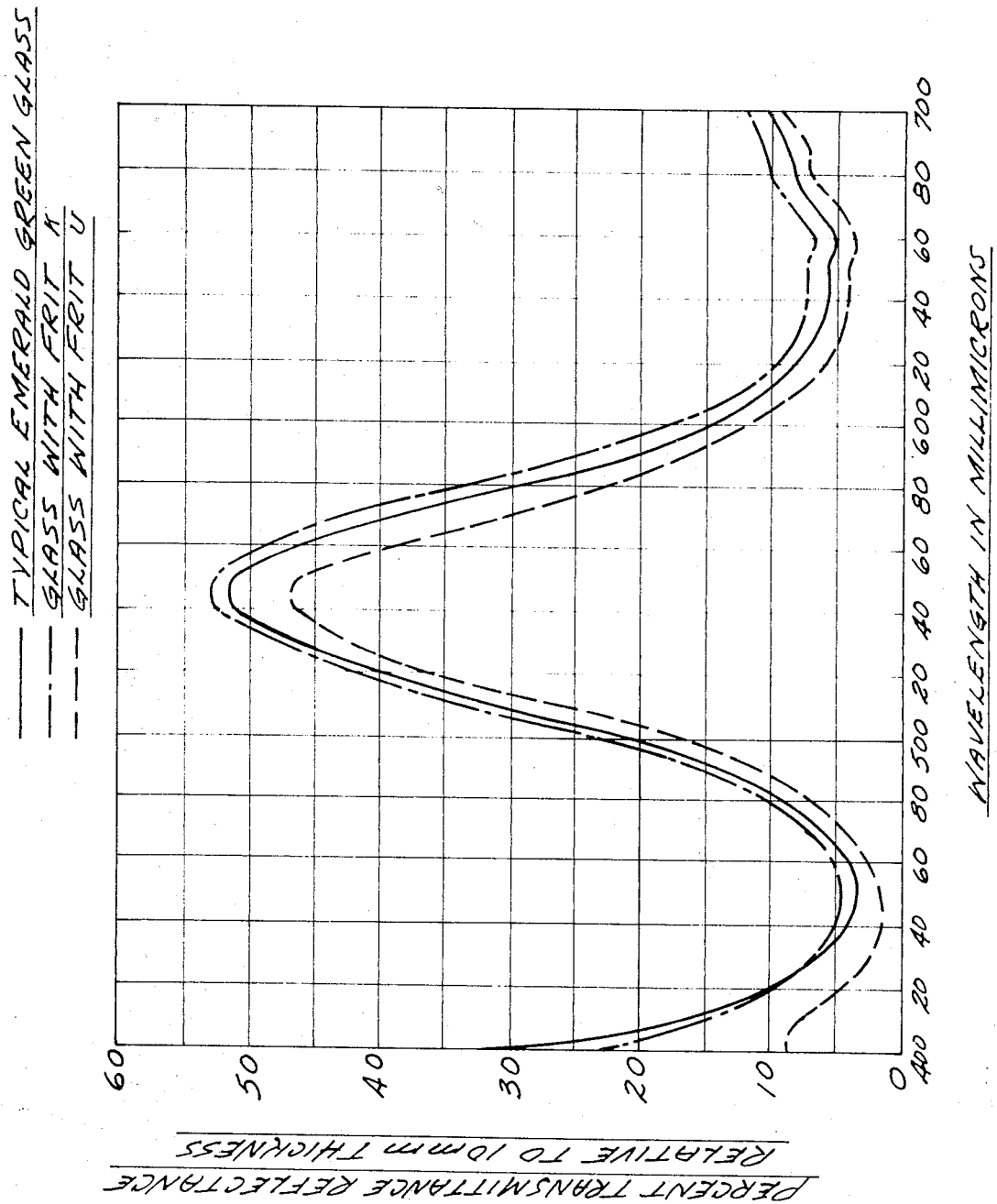

3,561,985
GLASS COLORANT COMPOSITIONS
Erwin C. Hagedorn, Oregon, and Dallas P. Hall, Toledo, Ohio, assignors to Owens-Illinois, Inc., a corporation of Ohio
Continuation-in-part of application Ser. No. 285,088, June 3, 1963. This application Sept. 16, 1966, Ser. No. 579,971
Int. Cl. C03c 3/08
U.S. Cl. 106—54       5 Claims

ABSTRACT OF THE DISCLOSURE

Colorant-enriched frit glass compositions of the following ingredients are disclosed together with methods of producing colored glasses using same:

| | Percent by weight | | |
|---|---|---|---|
| | Composition 1 | Composition 2 | Composition 3 |
| Ingredients: | | | |
| $SiO_2$ | 15–50 | | |
| $Cr_2O_3$ | 2–10 | 2–10 | |
| $R_2O$ | 23–46 | | |
| $Na_2O$ | X | 21–30 | 10–40 |
| $K_2O$ | (¹) | 0–7 | |
| $B_2O_3$ | 10.5–47 | 49–70 | 35–70 |
| $R_2O + B_2O_3$ | 44–74 | | |
| $Fe_2O_3$ | | 0–10 | |
| $CoO$ | | 0–8 | 0–43 |
| $MnO$ | | 0–18 | 0–23 |
| $PbO$, $BaO$ and $ZnO$ | | 0–15 | |
| $NiO$ | | | ² 0–18 |
| $Fe_2O_3$ | | | ² 0–18 |
| $ZnO$ | | | ² 0–43 |
| $CuO$ | | | ² 0–28 |

¹ Less than 25% X.
² At least 2%.

The present application is a continuation-in-part of applicant's copending application Ser. No. 285,088, filed June 3, 1963, and now abandoned in favor of the present application.

This invention relates to a colorant-enriched glass suitable for use in coloring a base glass and, more particularly, to a colorant-enriched glass frit having a high concentration of chromium oxides.

Colorant-enriched glasses suitable for forehearth addition, in frit or molten form, to a colorless base glass to form a composite color glass are known, as are colorant-enriched glass frits containing chromium oxides. A number of patents disclosing such frits for making colored glasses and ultraviolet absorbent glasses, the latter having a specific concentration of chromium oxide wherein the chromium is hexavalent, have been issued to the assignee of the present application.

Colorant-enriched glass compositions are disclosed in Hagedorn Pat. 3,024,121, granted Mar. 6, 1962; Swain Pat. 2,923,636 granted Feb. 2, 1960; and Babcock Pat. 3,024,120, granted Mar. 6, 1962.

In general, however, such frits as disclosed in these patents have high melting temperatures and/or relatively high viscosities when molten, so as to present certain difficulties and disadvantages in the processes for forming colored glasses. These include higher costs due to the need of increased temperatures to melt the frit, volatilization and consequent loss of certain of the ingredients in the glass because of the high temperature, increased tendency for the chromium and other colorant oxides at high percentages to crystallize and form inclusions in the resulting colored glass, and difficulty in thoroughly dispersing the molten frit throughout the molten base glass due to the relatively high viscosity of the molten frit. Solution and devitrification problems are greatly increased, especially in the production of highly reduced chromium frits.

Accordingly, it is an object of the present invention to provide a colorant-enriched glass composition suitable for use in coloring a base glass, and which is free of the aforementioned difficulties and disadvantages.

It is a further object of the present invention to provide a family of colorant-enriched glasses suitable for use in coloring a base glass, which glasses have low melting temperatures, low viscosities, and are readily miscible with colorless molten base glasses to form uniformly colored glasses.

It is another object of the present invention to provide glasses having a high concentration of chromium oxides, i.e., from about 2 to about 10% or more, and which, when added in frit or molten form to a colorless molten base glass, impart a yellow-green, green, or blue color to the base glasses, and which, if desired, will also impart the ability to absorb substantially all ultraviolet radiation to which it may be subjected.

In attaining the objects of the present invention, one feature resides in maintaining the silica content of the colorant-enriched glass at a low level while maintaining a high concentration of a mixture of alkali metal oxides and $B_2O_3$ wherein the total of the alkali metal oxides and $B_2O_3$ is from 44% to 74% by weight of the colorant-enriched glass, which glass has a lower viscosity and is more readily miscible with the molten base glass than conventional high-silica-coloring frits.

Another feature of the invention resides in forming a colorant-enriched, silica-free glass having a critical content of alkali metal oxides and $B_2O_3$, which glass can be formed at a temperature as low as from about 1200°–1400° F., and which has a low viscosity relative to known highly colorant-enriched glass frits, so that it can readily be added to and mixed with a molten base glass at the forehearth to produce a uniform color in the resulting glass article.

Other objects, features, and advantages of this invention will become more apparent from a reading of the following disclosure.

Glass frits having the capacity to dissolve significant amounts of various colorant oxides such as chromium, cobalt, nickel, iron, zinc, manganese and copper, while maintaining a low viscosity have many advantages over frits of the prior art, including (1) making possible and practicable the formation of high-chromium colored glasses such as emerald green, Ultrasorb emerald green, and champagne green; (2) reducing the amount of frit necessary to impart the desired colors; (3) improving the mixing in the forehearth due to lower viscosity and surface tension; (4) reducing the temperature necessary for melting the frit; and (5) making possible molten frit additions from small electric furnaces above the forehearths.

It has been found that highly colorant-enriched glass compositions having the following essential ingredients are suitable for addition as frits or in a molten state, to a molten colorless base glass at the forehearth:

| Ingredients: | Percent by weight |
|---|---|
| $SiO_2$ | 15–50 |
| $Cr_2O_3$ | over 2 |
| $R_2O$ | 23–46 |
| $B_2O_3$ | 10.5–47 |
| Total of $R_2O$ and $B_2O_3$ | 44–74 |

In the above list, $R_2O$ represents a mixture of $Na_2O$ and $K_2O$, with the latter being present in an amount less than 25% by weight of the former. The foregoing compositions can accommodate, without recrystallization, more than 2% by weight of the various colorant oxides. Thus, the compositions of the invention contain more than 2% chromium oxides in the vitreous state.

When colorant-enriched glass frits made in accordance with this invention are to be stored for any length of time prior to use, it has been found that the presence of $Al_2O_3$ in the frit composition increases the chemical durability of the frit while simultaneously preventing the agglomeration of the frit particles. When forehearth frit additions are made, it is important that the frit particles be free-flowing and readily dispersible throughout the molten base glass. The presence of a sufficient amount of alumina, up to about 10 percent by weight of the glass frit composition, and preferably from 0.5 to 7%, prevents the frit particles from adhering to each other during storage.

While the oxides of chromium are present, other metal oxides can also be present in the glass frit composition in the following amounts without materially affecting the ability of the frit to hold a high chromium content, it being understood that the maximum amount of each should not be present in the composition at the same time.

| Ingredients: | Percent by weight |
|---|---|
| CaO | 0–11 |
| MgO | 0–5 |
| BaO | 0–5 |
| $Li_2O$ | 0–5 |
| CoO | 0–10 |
| NiO | 0–6.5 |
| $Fe_2O_3$ | 0–10.0 |
| PbO | 0–10.0 |
| $Al_2O_3$ | 0–10 |

When the amounts of $K_2O$, $Na_2O$ and $B_2O_3$ were outside of the ranges set forth above, attempts to make the colorant-enriched glasses or frits were unsuccessful due to the formation of chromium oxide crystals in the glasses.

It has also been that high colorant-enriched glasses useful for forehearth addition to a molten base glass can be made without the presence of any silica, and such glasses, useful for addition as frits or by direct addition to the forehearth in molten form, have the following essential ingredients:

| Ingredients: | Percent by weight |
|---|---|
| $Na_2O$ | 21–30 |
| $K_2O$ | 0–7 |
| $B_2O_3$ | 49–70 |
| $Cr_2O_3$ | over 2 |
| $Fe_2O_3$ | 0–10 |

The total amount of $Cr_2O_3$ in the vitreous state in the composition will vary from above 2 to about 10% or more. Minor amounts of the following oxides may also be present without materially affecting the low melting temperature or relatively low viscosity of the above composition.

| | Percent by weight |
|---|---|
| CoO | 0–8 |
| MnO | 0–18 |

Illustrative examples of silica-free, highly colorant-enriched glasses coming within the scope of the invention are set forth in the following table.

TABLE III.—COLORANT-ENRICHED GLASSES (PERCENT BY WEIGHT)

| | L | M | N | O | P | Q | R | S | T | U |
|---|---|---|---|---|---|---|---|---|---|---|
| Ingredients: | | | | | | | | | | |
| $Na_2O$ | 27.0 | 28.94 | 21.86 | 23.5 | 24.96 | 25.77 | 25.8 | 26.19 | 24.77 | 24.90 |
| $K_2O$ | 4.6 | 2.16 | 4.16 | 4.47 | 4.75 | 4.90 | 6.2 | 4.98 | 4.22 | 4.26 |
| $B_2O_3$ | 60.9 | 65.4 | 49.35 | 53.0 | 56.35 | 58.17 | 58.0 | 59.12 | 55.87 | 56.11 |
| $Cr_2O_3$ | 7.5 | 3.5 | 6.73 | 7.23 | 7.68 | 7.93 | 10.0 | 8.06 | 6.88 | 6.88 |
| CoO | | | | | | | | | 8.26 | 7.76 |
| $Fe_2O_3$ | | | | | | | | | | |
| MnO | | 17.90 | 11.78 | 6.26 | 3.23 | | 1.64 | | | |

The following are illustrative of frits coming within the scope of this invention:

TABLE I.—COLORANT-ENRICHED GLASSES (PERCENT BY WEIGHT)

| | (A) | (B) | (C) | (D) | (E) | (F) | (G) | (H) | (I) | (J) | (K) |
|---|---|---|---|---|---|---|---|---|---|---|---|
| Ingredients: | | | | | | | | | | | |
| $SiO_2$ | 40.99 | 18.17 | 32.54 | 23.51 | 40.01 | 22.87 | 41.39 | 23.59 | 42.81 | 22.20 | 30.61 |
| $Cr_2O_3$ | 4.85 | 5.36 | 5.35 | 5.35 | 6.59 | 6.89 | 8.32 | 7.10 | 4.62 | 8.32 | 6.65 |
| $Na_2O$ | 27.13 | 33.58 | 44.41 | 43.75 | 26.36 | 31.84 | 30.65 | 36.05 | 29.17 | 40.85 | 20.42 |
| $K_2O$ | 1.50 | 1.66 | 1.66 | 1.66 | 1.10 | 2.15 | 2.58 | 4.39 | 3.53 | 2.58 | 4.12 |
| $B_2O_3$ | 22.29 | 37.86 | 12.47 | 22.09 | 21.65 | 21.36 | 11.64 | 22.01 | 11.0 | 20.63 | 30.16 |
| $Al_2O_3$ | 0.84 | 0.93 | 0.93 | 0.93 | 1.15 | 1.20 | 1.44 | 6.61 | 3.59 | 1.44 | |
| MgO | 0.56 | 0.62 | 0.61 | 0.61 | 0.76 | 0.80 | 0.97 | | | 0.97 | |
| $Fe_2O_3$ | 1.53 | 1.76 | 1.76 | 1.76 | 2.09 | 2.18 | 2.58 | 0.03 | 0.03 | 2.64 | 8.04 |
| $Co_3O_4$ | 0.31 | | 0.29 | 0.28 | 0.30 | 0.37 | 0.44 | 0.25 | 0.22 | 0.37 | |
| CaO | | | | | | 10.33 | | | | | |
| PbO | | | | | | | | 5.03 | | | |

The frits of Table I were prepared by melting the following raw batch materials and quenching on a steel plate.

TABLE II.—COMPOSITION (PARTS BY WEIGHT)

| | A | B | C | D | E | F | G | H | I | J | K |
|---|---|---|---|---|---|---|---|---|---|---|---|
| Raw materials: | | | | | | | | | | | |
| Sand | 42.1 | 20.0 | 36.2 | 26.15 | 22.1 | 19.6 | 36.9 | | 12.08 | 26.15 | 33.35 |
| Soda ash | 30.8 | 64.8 | 75.3 | 66.9 | 30.81 | 33.7 | 39.7 | 2.04 | | 66.9 | 15.00 |
| Borax (dehydrated) | 34.1 | | 20.8 | 36.8 | 34.1 | 27.6 | 15.6 | 32.7 | 16.24 | 36.8 | 50.00 |
| Iron chromite | 5.78 | 6.94 | 6.94 | 6.94 | 8.12 | 6.95 | 8.7 | | 11.6 | | |
| Potassium dichromate | 4.83 | 5.80 | 5.80 | 5.80 | 6.76 | 5.79 | 7.27 | 13.75 | 8.90 | 9.70 | 14.77 |
| Cobalt oxide ($Co_3O_4$) | 0.32 | | 0.32 | 0.32 | 0.32 | 0.32 | 0.40 | 0.27 | 0.22 | 0.53 | |
| Boric acid (anhydride) | | 42.4 | | | | | | | | | 2.29 |
| Calcium carbonate | | | | | | 16.0 | | | | | |
| Nepheline syenite | | | | | | | | | 15.25 | | |
| Sodium silicate (anhydride) | | | | | | | | 52.7 | 47.7 | | |
| Lead oxide ($Pb_3O_4$) | | | | | | | | 5.19 | | | |
| $MnO_2$ | | | | | | | | | | | |
| $K_2MnO_4$ | | | | | | | | | | | |
| Iron scale | | | | | | | | | | | 8.30 |
| Sea coal | | | | | | | | | | | 2.40 |
| $Al_2O_3$ | | | | | | 6.62 | | | | | |

Again, it is to be understood that the maximum amounts of these added oxides are not to be present at one time. If one wanted; one could add up to about 10% or more $SiO_2$ to the aforesaid listed compositions as long as the ability of the particular composition to accommodate the desired amount of chromium oxide in the vitreous state was not materially affected.

In practicing the present invention, it is often advantageous to adjust the density of the frit glass to approach the density of the base glass in the interest of efficiency in mixing. We have found that this can be accomplished by incorporating the oxides of lead, barium, zinc, and mixtures thereof into the sodium borate frit composition. For instance, ordinary sodalime base glass has a density of about 2.5 gm./cc., while certain of the sodium borate frits of the invention have a density of about 2.4 gm./cc. It has been found that the density of the frit can be "tailored" to achieve optimum mixing by incorporating up to 15% of the combined oxides of ZnO, BaO and PbO into the frit batch. In the ideal situation, the density of the frit will be numerically equal to or greater than the density of the base glass.

TABLE III(a).—COLORANT-ENRICHED GLASSES (PERCENT BY WEIGHT)

| | V | W | X | Y | Z | AA |
|---|---|---|---|---|---|---|
| Ingredients: | | | | | | |
| $Na_2O$ | 26.96 | 18.48 | 25.39 | 25.39 | 23.60 | 24.45 |
| $K_2O$ | 4.59 | | 4.59 | 4.59 | 4.73 | 4.59 |
| $B_2O_3$ | 61.94 | 41.52 | 57.49 | 57.49 | 53.45 | 55.36 |
| $Cr_2O_3$ | 7.41 | | 7.41 | 7.41 | 7.65 | 7.41 |
| CoO | | | | | | |
| $Fe_2O_3$ | | | | | | |
| MnO | | | | | | |
| ZnO | | 40.0 | | 5.12 | | |
| $Pb_3O_4$ | | | 5.12 | | | 8.19 |
| BaO | | | | | 10.56 | |
| NiO | | | | | | |
| CuO | | | | | | |
| Density, gm./cc | 2.376 | 2.778 | 2.476 | 2.435 | 2.544 | 2.537 |

It is usually preferred that at least 5% of the particular colorant oxide be present in the frit to minimize the amount of frit to be added to achieve the desired degree of coloration in the composite glass.

In one embodiment of the present invention a single colorant oxide from the above list is present in the alkali borate frit. The amount of colorants will be at least 2% by weight and preferably 5% by weight of the frit composition. The maximum amount of colorant will be that shown in the above table.

For instance, in the sodium borate system containing a single colorant oxide, the composition ranges are as follows:

| Colorant oxide | Component | Broad range, percent | Preferred range, percent |
|---|---|---|---|
| Nickel as the single colorant | $B_2O_3$ | 35-70 | 40-65 |
| | $Na_2O$ | 10-40 | 15-30 |
| | NiO | 2-18 | 5-18 |
| Iron as the single colorant | $B_2O_3$ | 35-70 | 40-65 |
| | $Na_2O$ | 10-40 | 15-30 |
| | [1]$Fe_2O_3$ | 2-18 | 5-18 |
| Manganese as the single colorant | $B_2O_3$ | 35-70 | 40-65 |
| | $Na_2O$ | 10-40 | 15-30 |
| | [2]MnO | 1-23 | 5-23 |
| Cobalt as the single colorant | $B_2O_3$ | 35-70 | 40-65 |
| | $Na_2O$ | 10-40 | 15-30 |
| | CoO | 2-43 | 5-43 |
| Zinc as the single colorant | $B_2O_3$ | 35-70 | 40-65 |
| | $Na_2O$ | 10-40 | 15-30 |
| | ZnO | 2-43 | 5-43 |
| Copper as the single colorant | $B_2O_3$ | 35-70 | 40-65 |
| | $Na_2O$ | 10-40 | 15-30 |
| | CuO | 2-28 | 5-28 |

[1] Total iron.
[2] Total manganese.

In the absence of the oxides of chromium, the alkali borate system of the invention is an excellent vehicle for the forehearth addition of other colorant metal oxides to a molten base glass. We have found that these alkali borate glasses, particularly the sodium borate glasses, are capable of dissolving unexpected amounts of the oxides of nickel, iron, manganese, cobalt, zinc, copper and mixtures thereof. It will be understood that the maximum solubility of any particular colorant oxide occurs when all other colorants are absent, even though significant amounts of the above mentioned oxides can be dissolved together in a single frit composition.

Usually these frits are within the composition range:

Oxide: Percent by weight
$B_2O_3$ ——————————————————— 35–70
$Na_2O$ ——————————————————— 10–40
NiO ——————————————————— 0–18
Total manganese as MnO ——————————— 0–23
Total Manganese as MnO ——————————— 0–23
CoO ——————————————————— 0–43
ZnO ——————————————————— 0–43
CuO ——————————————————— 0–28

(wherein the combined colorant oxide content is at least 2% by weight).

TABLE III(b).—COLORANT-ENRICHED GLASSES (PERCENT BY WEIGHT)

| | BB | CC | DD | EE | FF |
|---|---|---|---|---|---|
| Ingredients: | | | | | |
| $Na_2O$ | 26.18 | 26.18 | 24.64 | 18.48 | 23.1 |
| $K_2O$ | | | | | |
| $B_2O_3$ | 58.82 | 58.82 | 55.36 | 41.52 | 51.9 |
| $Cr_2O_3$ | | | | | |
| CoO | | | | 40.0 | |
| $Fe_2O_3$ | | 15.0 | | | |
| MnO | | | 20.0 | | |
| ZnO | | | | | |
| $Pb_3O_4$ | 8.19 | | | | |
| BaO | | | | | |
| NiO | 15.0 | | | | |
| CuO | | | | | 25.0 |

The above frits were made by melting the following raw batch materials, cooling the melt and quenching on a steel plate.

TABLE IV

| Raw materials: | L | M | N | O | P | Q | R | S | T | U | V | W | X | Y | Z | AA | BB | CC | DD | EE | FF |
|---|---|---|---|---|---|---|---|---|---|---|---|---|---|---|---|---|---|---|---|---|---|
| Sand | | 97.0 | 100.0 | 100.0 | 100.0 | 100.0 | 84.0 | 100.0 | 100.0 | 100.0 | 86 | 1,000 | 81 | 81 | 73 | 78 | 1,000 | 1,000 | 1,000 | 1,000 | 1,000 |
| Soda ash | 100.0 | | | | | | | | | | | | | | | | | | | | |
| Borax (dehydrated) | 16.0 | 6.76 | 17.79 | 17.79 | 17.79 | 17.77 | 19.35 | 17.79 | 16.0 | 16.0 | 14 | | 14 | 14 | 14 | 14 | | | | | |
| Iron chromite | | | | | | | | | 9.8 | | | | | | | | | | | | |
| Potassium dichromate | | | 30.0 | 15.0 | 7.50 | 3.75 | | 1.87 | | | | | | | | | | | | | |
| Cobalt oxide (CoO) | | | 54.6 | | | | | | | | | | | | | | | | | | |
| Boric acid (anhydride) | | | | | | | | | | 8.4 | | | | | | | | | | | |
| Calcium carbonate | | | | | | | | | | 2.4 | | | | | | | | | | | |
| Nepheline syenite | | | | | | | | | | | | | | | | | | | | | |
| Sodium silicate (anhydride) | | | | | | | | | | | | | 5 | 5 | | 8 | | | | | |
| Lead oxide (Pb₃O₄) | | | | | | | | | | | | | | | 13 | | | | | | |
| MnO₂ | | | | | | | | | | | | | | | | | | | | | |
| K₂MnO₄ | | | | | | | | | | | | | | | | | | | | | |
| Iron scale | | | | | | | | | | | | | | | | | | | | | |
| Sea coal | | | | | | | | | | | | | | | | | | | | | |
| Al₂O₃ | | | | | | | | | | | | 666.4 | | | | | | | | | |
| ZnO | | | | | | | | | | | | | | | | | 176.4 | 176.4 | | | |
| BaCO₃ | | | | | | | | | | | | | | | | | | | | 666.4 | |
| NiO | | | | | | | | | | | | | | | | | | | 250 | | |
| Fe₂O₃ | | | | | | | | | | | | | | | | | | | | | |
| MnO | | | | | | | | | | | | | | | | | | | | | 333.3 |
| CoO | | | | | | | | | | | | | | | | | | | | | |
| CuO | | | | | | | | | | | | | | | | | | | | | |

When attempts were made to form silica-free, colorant-enriched glass compositions containing chromium wherein the amounts of Na₂O and B₂O₃ were outside of the ranges set forth in Tables III or III(a) or III(b), chromium oxide crystals were formed in the glasses, which crystals were extremely difficult to melt, even when the glasses were subjected to higher temperatures. Due to such crystal formations, these glasses were unsuitable for use as colorant additives to molten base glass compositions.

The base composition of the silica-free frits may be $Na_2B_4O_7$ which, in hydrate form $(Na_2B_4O_7 \cdot 5H_2O)$ is common borax. These frits can be melted at very low temperatures, i.e., 1200–1300° F. when potassium dichromate is used as the source of chromium. Such silica-free frits also have surprisingly good chemical durability. Some have shown no signs of weathering or caking over a period of a year or two and, since they are non-hygroscopic, they always feel dry to the touch.

Since the solubility of hexavalent chromium exceeds the solubility of trivalent chromium, making such frits suitable for use in producing colored ultraviolet-absorbing glasses, it has been possible to incorporate reducing agents, such as sea coal, sucrose, iron scale, aluminum metal, into the composition so as to increase the amount of $Cr_2O_3$ at the expense of $CrO_3$.

The total chromium oxide in the compositions set forth in the tables and the claims is expressed as "$Cr_2O_3$." All of the chromium oxide in the frit may be in the trivalent form $(Cr_2O_3)$ or a mixture of the trivalent with the hexavalent form $(CrO_3)$. The actual $CrO_3$ content of any given frit is dependent upon two factors, namely (1) the addition of the chromium to the frit batch as dichromate and (2) the oxidation state of the frit batch during melting. In certain examples, e.g., Examples H, I and K, all of the chromium was added as dichromate.

In other examples, the chromium was added as equal parts by weight of potassium dichromate and chromite, a mineral containing $FeO \cdot Cr_2O_3$. In the manufacture of ultraviolet-absorbent composite glasses, a residual hexavalent chromium content is desired, and an oxidizing agent such as niter is preferably added to maintain strongly oxidizing conditions in the frit batch. A full discussion of the $Cr_2O_3$—$CrO_3$ relation is to be found in Pat. No. 2,923,636 assigned to the assignee of the present invention.

The above colorant-enriched compositions in Examples A–U, inclusive, were prepared by melting the batch ingredients at various temperatures of from 1300–2500° F. for a time of from ½ to 1 hour. The batches in Examples V through FF were melted at 1600° F. for 1½ hours. Platinum crucibles were used in all instances, and an air atmosphere was maintained in the furnace.

In forming a frit having a chromium content in a highly oxidized state, alkali dichromate is preferably utilized as the source of chromium. When the chromium is added as an iron chromite or a mixture containing iron chromite, all of the iron must be completely oxidized before there can be any hexavalent chromium in the glass composition. Frits which are relatively high in hexavalent chromium $(CrO_3)$ are suitable for the forehearth production of ultraviolet-absorbing glasses, such as yellow-green, green, and blue glasses.

Examples H and T from the above tables, which are illustrative of highly oxidized chromium frits, were added to the following molten base glass composition.

|  | Percent by weight | |
|---|---|---|
|  | Glass 1 | Glass 2 |
| Ingredients: | | |
| SiO₂ | 72.23 | 72.12 |
| Al₂O₃ | 1.69 | 1.74 |
| CaO | 11.40 | 11.29 |
| MgO | 1.03 | 1.15 |
| Na₂O | 13.44 | 13.34 |
| K₂O | 0.17 | 0.32 |
| Fe₂O₃ | 0.04 | 0.04 |

The resulting ultraviolet-absorbing glasses had the following compositions:

|  | Weight percent | |
|---|---|---|
|  | Glass 1 with frit H | Glass 2 with frit T |
| Ingredients: | | |
| $SiO_2$ | 71.57 | 71.59 |
| $Al_2O_3$ | 1.73 | 1.73 |
| CaO | 11.44 | 11.21 |
| MgO | 1.02 | 1.14 |
| $Na_2O$ | 13.57 | 13.42 |
| $K_2O$ | 0.21 | .35 |
| $B_2O_3$ | 0.36 | .41 |
| $Fe_2O_3$ | 0.04 | .04 |
| $Cr_2O_3$ (total chromium) | .06 | .05 |
| $CrO_3$ (analyzed) | .014 | .008 |
| CoO | .002 | .06 |
| Percent brightness | 82.8 | 36.65 |
| Percent purity | 21.3 | 24.9 |
| Dominant wave length in millimicrons | 567 | 482.0 |
| Percent transmittance at 400 mu (2 mm. thickness) | 9.7 | 19.5 |
| Color | Yellow-green | Blue |

Typical base compositions which have been used for forehearth frit additions of the present invention are essentially conventional glasses formed in a conventional manner, including soda-lime-silica glasses. The conditions and procedures for making such molten base glasses are known to those skilled in the art, as exemplified in Table IX, B–11, on page 245 of "Handbook of Glass Manufacture" by Tooley, Ogden Publishing Co., New York, N.Y., 1953.

Suitable soda-lime-silica glass compositions have the following ranges of ingredients in percent by weight:

| Ingredients: | Percent by weight |
|---|---|
| $SiO_2$ | 60–75 |
| $Al_2O_3$ | 0.3–10 |
| CaO | 3.5–13 |
| MgO | 0–7 |
| CaO+MgO | 6–15 |
| $Na_2O$ | 12–18 |
| $K_2O$ | 0–5 |
| BaO | 0–5 |

Low-silica and silica-free glass frits wherein the chromium content is in the reduced state are produced by utilizing an alkali dichromate as the source of chromium, and adding thereto a sufficient amount of reducing agent such as carbon, sugar, starch, powdered aluminum, iron scale, sea coal, etc., to convert the hexavalent chromium to trivalent chromium. Combinations of sea coal and iron scale in the frit batch have produced high-chrome frits which, when added to molten flint glasses, produce an emerald green glass comparable to the accepted standard emerald green.

Two frits having the chromium content in the reduced state are shown in the following examples:

FRIT GLASS COMPOSITION

|  | Weight percent | |
|---|---|---|
|  | Frit K | Frit U |
| Ingredients: | | |
| $Si_2O$ | 30.61 | 0 |
| $Na_2O$ | 20.42 | 24.90 |
| $K_2O$ | 4.12 | 4.26 |
| $B_2O_3$ | 30.16 | 56.11 |
| $Fe_2O_3$ (total iron) | 8.04 | 7.76 |
| $Cr_2O_3$ (total chromium) | 6.65 | 6.88 |
| Batch weights: | | |
| Sand | 33.35 | 0 |
| Borax (anhydrous) | 50.00 | 100 |
| Boric acid (anhydrous) | 2.29 | 0 |
| Soda ash | 15.00 | 0 |
| Potassium dichromate | 14.77 | 16.0 |
| Iron scale | 8.30 | 8.40 |
| Sea coal | 2.40 | 2.40 |

The batch ingredients were melted at a temperature of 2000° F. for 1 hour, cooled and fritted. The frits were then added by forehearth addition to a glass having the following composition:

| Ingredients: | Percent by weight |
|---|---|
| $SiO_2$ | 72.12 |
| $Al_2O_3$ | 1.74 |
| CaO | 11.29 |
| MgO | 1.15 |
| $Na_2O$ | 13.34 |
| $K_2O$ | 0.32 |
| $Fe_2O_3$ | 0.04 |

The final colored glass had the following composition:

|  | Percent by weight | |
|---|---|---|
|  | Glass with frit K | Glass with frit U |
| Ingredients: | | |
| $SiO_2$ | 70.94 | 70.10 |
| $Al_2O_3$ | 1.69 | 1.69 |
| CaO | 10.95 | 10.98 |
| MgO | 1.12 | 1.12 |
| $Na_2O$ | 13.53 | 13.67 |
| $K_2O$ | 0.43 | 0.43 |
| $B_2O_3$ | 0.88 | 1.59 |
| $Fe_2O_3$ (total iron) | 0.26 | 0.22 |
| $Cr_2O_3$ (total chromium) | 0.20 | 0.20 |
| Analyzed constituents: | | |
| $Fe_2O_3$ (total iron) | | 0.234 |
| FeO | | 0.0028 |
| $Cr_2O_3$ (total chromium) | | 0.220 |
| CIE data (10 mm.): | | |
| Percent brightness | 35.4 | 28.8 |
| Percent purity | 63.0 | 75.0 |
| Dominant wave length in millimicrons | 555.5 | 556.0 |

A typical emerald green glass has 35.0% brightness, 66.0% purity, and a dominant wave length—mu of 555.0.

From the graph in the drawing, the similarity in wave length between a natural emerald green glass and glasses of the foregoing examples made with frits U and K will be readily evident.

Examples V and W in Table III demonstrate how the density of the frits of the invention may vary with composition. Examples X through AA demonstrate how the density of the colorant frit may be adjusted to approximate the density of the soda-lime base glass through the use of the oxides of zinc, lead and barium.

Exemplary frits BB through FF are sodium borate colorant frit compositions, containing colorants other than chromium that are suitable for coloring soda-lime silica base glasses. These frits are low melting and are readily admixed with the base glass at forehearth temperatures to produce uniformly colored composite glasses.

The use of frits AA through EE is demonstrated by the following examples.

An ordinary colorless soda-lime base glass of the composition:

| | Percent |
|---|---|
| $SiO_2$ | 72.41 |
| $Al_2O_3$ | 1.75 |
| CaO | 11.10 |
| MgO | 0.91 |
| $Na_2O$ | 13.34 |
| $K_2O$ | 0.44 |
| $Fe_2O_3$ | 0.03 | was melted in an ordinary glass melting furnace according to the method described (see column 9). Frit composition BB (Table III) was added to the base glass at forehearth temperatures in the ratio of 6.7 pounds per ton of base glass. This addition was accomplished after the base glass had issued from the melting tank into the forehearth at temperatures in the range of 2300–2600° F.

The resulting composite glass was yellow in color and had the following composition and properties:

| | Percent |
|---|---|
| $SiO_2$ | 72.08 |
| $Al_2O_3$ | 1.74 |
| CaO | 11.05 |
| MgO | 0.91 |
| $Na_2O$ | 13.41 |
| $K_2O$ | 0.44 |
| $B_2O_3$ | 0.29 |
| $Fe_2O_3$ | 0.03 |
| NiO | 0.05 |

CIE. data (2 mm. thickness):
  Percent brightness—74
  Percent purity—8
  Dominant wavelength—575μ

Frit composition DD (Table III) was added at the rate of 25.3 pounds of frit per ton of base glass to the colorless soda-lime base glass described (see column 10) by the forehearth method described above. The resulting composite glass was light orange in color and had the following composition and properties:

| | Percent |
|---|---|
| $SiO_2$ | 71.51 |
| $Al_2O_3$ | 1.73 |
| CaO | 10.96 |
| MgO | 0.90 |
| $Na_2O$ | 13.48 |
| $K_2O$ | 0.44 |
| $B_2O_3$ | 0.70 |
| $Fe_2O_3$ | 0.03 |
| MnO | 0.25 |

CIE. data (2 mm. thickness):
  Percent brightness—84
  Percent purity—1.5
  Dominant wavelength—597μ

Frit glass composition FF (Table III) was added to the colorless base glass described (see column 10) by the method described above. The ratio of addition was 32.5 pounds of frit per ton of base glass. The resulting composite glass was blue green in color and had the following composition and properties:

| | Percent |
|---|---|
| $SiO_2$ | 71.27 |
| $Al_2O_3$ | 1.72 |
| CaO | 10.91 |
| MgO | 0.90 |
| $Na_2O$ | 13.50 |
| $K_2O$ | 0.44 |
| $B_2O_3$ | 0.83 |
| $Fe_2O_3$ | 0.03 |
| CuO | 0.40 |

CIE. data (2 mm. thickness):
  Percent brightness—74
  Percent purity—16
  Dominant wavelength—486μ

While a low-silica-containing, colorant-enriched glass composition, useful in frit or molten form to color a molten base glass has been given above, a preferred composition is as follows:

| Ingredients: | Percent by weight |
|---|---|
| $SiO_2$ | 18–41 |
| $Cr_2O_3$ | 4–10 |
| $R_2O$ | 31–46 |
| $B_2O_3$ | 21–37 |
| Total of $R_2O$ and $B_2O_3$ | 52–74 |

$R_2O$ has the same values as given above, and the other oxides, also discussed above with the disclosure of the broad composition, may be present in the same designated amounts.

From the above disclosure, colored glasses meeting the desired optical properties and standards, as recognized by the industry and as set forth in Hagedorn Pat. 3,024,121 and incorporated herein by reference, can readily be made using the apparatus and methods disclosed in the aforesaid patent. Other suitable apparatus and methods are described in U.S. Pat. No. 3,057,175 to R. R. Rough.

Having fully described the invention, what is claimed is:

1. A colorant-enriched glass composition suitable for use in coloring a base glass, said colorant-enriched glass composition consisting essentially of the following ingredients in the indicated percentages by weight:

| Ingredients: | Percent by weight |
|---|---|
| $SiO_2$ | 18–41 |
| $Cr_2O_3$ (total chromium) | 4–10 |
| $R_2O$ | 31–46 |
| $B_2O_3$ | 21–37 | the total amount of said $R_2O$ and $B_2O_3$ being from 52% to 74% by weight of the glass composition, said $R_2O$ being a mixture of $Na_2O$ and $K_2O$, said $K_2O$ being present in an amount of less than 25% by weight of said $Na_2O$.

2. A colorant-enriched glass composition suitable for use in coloring a base glass, said colorant-enriched glass composition consisting essentially of the following ingredients in the indicated percentages by weight:

| Ingredients: | Percent by weight |
|---|---|
| $SiO_2$ | 18–41 |
| $Cr_2O_3$ (total chromium) | 4–10 |
| $R_2O$ | 31–46 |
| $B_2O_3$ | 21–37 | the total amount of said $R_2O$ and $B_2O_3$ being from 52% to 74% by weight of the glass composition, said $R_2O$ being a mixture of $Na_2O$ and $K_2O$, said $K_2O$ being present in an amount of less than 25% by weight of said $Na_2O$, and a minor amount of at least one of the following oxides up to the maximum portions indicated:

| | Maximum percent by weight |
|---|---|
| CaO | 11 |
| MgO | 5 |
| BaO | 5 |
| $Li_2O$ | 5 |
| CoO | 5 |
| NiO | 6.5 |
| $Fe_2O_3$ | 10 |
| PbO | 10 |
| $Al_2O_3$ | 10 |

3. A colorant-enriched glass frit suitable for use in coloring a base glass, said colorant-enriched glass frit consisting essentially of the following ingredients in the indicated percentages by weight:

| | Percent by weight |
|---|---|
| $SiO_2$ | 15–50 |
| $Cr_2O_3$ (total chromium) | 15–50 |
| $R_2O$ | 23–46 |
| $B_2O_3$ | 10.5–47 |
| $Al_2O_3$ | 0.5–7 | the total amount of said $R_2O$ and $B_2O_3$ being from 44% to 74% by weight of the glass frit composition, said $R_2O$ being a mixture of $Na_2O$ and $K_2O$, said $K_2O$ being present in an amount of less than 25% by weight of said $Na_2O$.

4. A colorant-enriched glass frit suitable for use in coloring a base glass, said colorant-enriched glass frit consisting essentially of the following ingredients in the indicated percentages by weight:

| Ingredients: | Percent by weight |
|---|---|
| $SiO_2$ | 18–41 |
| $Cr_2O_3$ (total chromium) | 4–10 |
| $R_2O$ | 31–46 |
| $B_2O_3$ | 21–37 |
| $Al_2O_3$ | Up to about 10 | the total amount of said $R_2O$ and $B_2O_3$ being from 52% to 74% by weight of the glass frit composition, said $R_2O$ being a mixture of $Na_2O$ and $K_2O$, said $K_2O$ being present in an amount of less than 25% by weight of said $Na_2O$, said $Al_2O_3$ being present in an amount sufficient to prevent said frit from agglomerating during storage thereof.

5. The colorant-enriched glas frit as defined in claim 4 wherein said $Al_2O_3$ is present in an amount of from about 0.5 to 7%.

References Cited

UNITED STATES PATENTS

| | | | |
|---|---|---|---|
| 3,312,556 | 4/1967 | Oikawa et al. | 106—48 |
| 3,285,773 | 11/1966 | Dunning | 106—48 |
| 3,024,120 | 3/1962 | Babcock | 106—52 |
| 3,005,721 | 10/1961 | Cerulli | 106—47 |
| 2,785,091 | 3/1957 | Rex | 106—48 |
| 2,753,271 | 7/1956 | Treptow | 106—48 |
| 3,203,815 | 8/1965 | Michael | 106—49 |
| 2,923,636 | 2/1960 | Swain. | |
| 3,024,121 | 3/1962 | Hagedorn. | |
| 3,144,270 | 8/1964 | Bennett et al. | 106—48 |

FOREIGN PATENTS

| | | | |
|---|---|---|---|
| 531,880 | 10/1956 | Canada | 106—54 |

OTHER REFERENCES

Spriggs et al.: Reaction Kinetics of Porcelain Enamel-Metal Systems, J. Amer. Cer. Soc., vol. 43 (1960), pp. 252–3 TP785A62.

Bancroft et al.: "Copper Oxide in the Borax Beads," J. Chem., 34, pp. 8–11 (1930).

Bancroft et al.: "Copper Oxide in the Borax Beads," J. Phys. Chem. 33, pp. 729–30 (1929).

Joos et al.: "Das Linienspektrum des Chromoxyds und Die Absorptionsspektren der Chromgläser," Z. Physical Chem., 24, pp. 389–392 (1934).

Bancroft et al.: "Manganese Oxide in the Borax Bead," J. Phys. Chem., 33, pp. 483–88 (1929).

HELEN M. McCARTHY, Primary Examiner

U.S. Cl. X.R.

106—47